(12) United States Patent
Alvarez et al.

(10) Patent No.: US 6,435,024 B1
(45) Date of Patent: Aug. 20, 2002

(54) METHOD AND APPARATUS FOR DETERMINING THE LEVEL OF PARTICULATE MATERIAL IN A PARTICULATE MATERIAL COLLECTION VESSEL

(75) Inventors: Victor L. Alvarez, Rochester; John C. Fournier, Lancaster, both of NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/675,413

(22) Filed: Sep. 29, 2000

(51) Int. Cl.⁷ .............................................. G01F 23/296
(52) U.S. Cl. .................................................... 73/290 V
(58) Field of Search ........................ 73/290 V, 290 U, 73/602, 627, 597, 598, 599, 600

(56) References Cited

U.S. PATENT DOCUMENTS

| | | | | |
|---|---|---|---|---|
| 3,498,500 A | * | 3/1970 | Hansen ........................ 222/23 |
| 4,159,786 A | * | 7/1979 | Biddle, III et al. ............ 222/64 |
| 4,313,343 A | * | 2/1982 | Kobayashi et al. ........ 73/290 V |
| 5,074,149 A | * | 12/1991 | Sterns .......................... 73/579 |
| 5,438,230 A | * | 8/1995 | Hall ............................. 310/316 |
| 5,440,930 A | * | 8/1995 | Daire et al. .................... 73/644 |
| 5,495,315 A | * | 2/1996 | Cherian ....................... 355/208 |
| 5,862,431 A | * | 1/1999 | Christensen .................. 399/27 |
| 5,922,030 A | * | 7/1999 | Shank et al. ................... 141/94 |
| 5,960,246 A | * | 9/1999 | Kasahara et al. ............ 399/359 |

FOREIGN PATENT DOCUMENTS

JP          4030422591 A    *  2/1991

* cited by examiner

*Primary Examiner*—Hezron Williams
*Assistant Examiner*—Rose M. Miller

(57) ABSTRACT

A method for determining a level of particulate material in a particulate material collection vessel and a level indicator particulate material collection vessel.

10 Claims, 4 Drawing Sheets

METHOD AND APPARATUS FOR DETERMINING THE LEVEL OF PARTICULATE MATERIAL IN A PARTICULATE MATERIAL COLLECTION VESSEL

FIELD OF THE INVENTION

This invention relates to a method for determining a level of particulate material in a particulate contaminate material collection vessel and a particulate contaminate material collection vessel having a particulate contaminant material level indicator.

BACKGROUND OF THE INVENTION

In the operation of copier/duplicator machines, it is necessary to provide a system for the recovery of particulate contaminants from inside the copier/duplicator machine. These contaminants may comprise particulate materials as varied as paper dust, toner, developer and the like. These particulate materials can vary substantially in their density and in other properties. Such particulates are typically recovered from copier/duplicator machines by a vacuum system which passes the air streams recovered from the inside of the copier/duplicator machine to a cyclone separator where particulates are separated with the gaseous components of the stream being withdrawn and passed to further filtration and the like. The particulates recovered from the cyclone separator are typically deposited in a collection vessel beneath the cyclone separator, although in some instances it is possible to position a cyclone separator in other than a vertical position. These particulates accumulate in the collection vessel and are periodically dumped from the collection vessel. In the event that the particulates accumulate in the collection vessel to an unacceptably high level, the failure to empty the collection vessel can lead to a toner blow out condition that contaminates the machine and the machine site. Such contamination in the copier/duplicator machine is very undesirable and creates many problems.

Unfortunately, the composition of the particulates collected in the collection vessel can vary widely from paper particulates to toner to developer. There is a wide disparity in the behavior of these various types of solids as well as in their density. Accordingly, attempts to use level control or detection systems such as Piezo electric systems have been relatively unsuccessful because they are relatively fragile and provide very short service lives. Similarly optical systems have been unsuccessful because the paper dust tends to form clouds and create false readings at the selected level for monitoring the particulates level in the collection vessel. Further weight systems are relatively inaccurate and can result in overfilling because the weight may be determined based upon a mixture of particulates which is more dense than those in fact collected. Further weight systems tend to be relatively inaccurate since they involve mechanical mounting and the like.

As a result, a continuing effort has been directed to the development of improved methods and apparatus for determining the level of particulate material in a particulate material collection vessel and for generating a signal to indicate the high level of particulates in the collection vessel.

SUMMARY OF THE INVENTION

According to the present invention, the level of particulate material in a particulate material collection vessel is readily determined by a method comprising: positioning a transmitter to transmit an acoustic wave signal through a particulate storage area in the vessel at a selected level to a receiver; providing electrical power to the transmitter; monitoring an acoustic wave signal received at the receiver to detect a change in the acoustic wave signal indicative of particulate material at the selected level in the particulate material storage area; and, generating a signal indicative of the presence of particulate material at the selected level in the particulate material storage area.

The present invention further comprises a particulate collection vessel having a particulate material level indicator and comprising: a vessel having a particulate material inlet, the inlet being configured for connection to a cyclone separator particulate material outlet; a transmitter transducer acoustically coupled to the vessel or positioned inside the vessel at a selected level and adapted to transmit an acoustic wave signal across at least a portion of a particulate material storage area inside the vessel; a receiver acoustically coupled to the vessel or positioned inside the vessel at the selected level and adapted to receive the transmitted acoustic wave signal; and, a comparator connected to the receiver and adapted to generate a signal responsive to a change in the acoustic wave signal indicative of particulate material in the particulate material storage area at the selected level.

DESCRIPTION OF PREFERRED EMBODIMENTS

In the discussion of the Figures, the same numbers will be used throughout to refer to the same or similar components.

Figure 1:
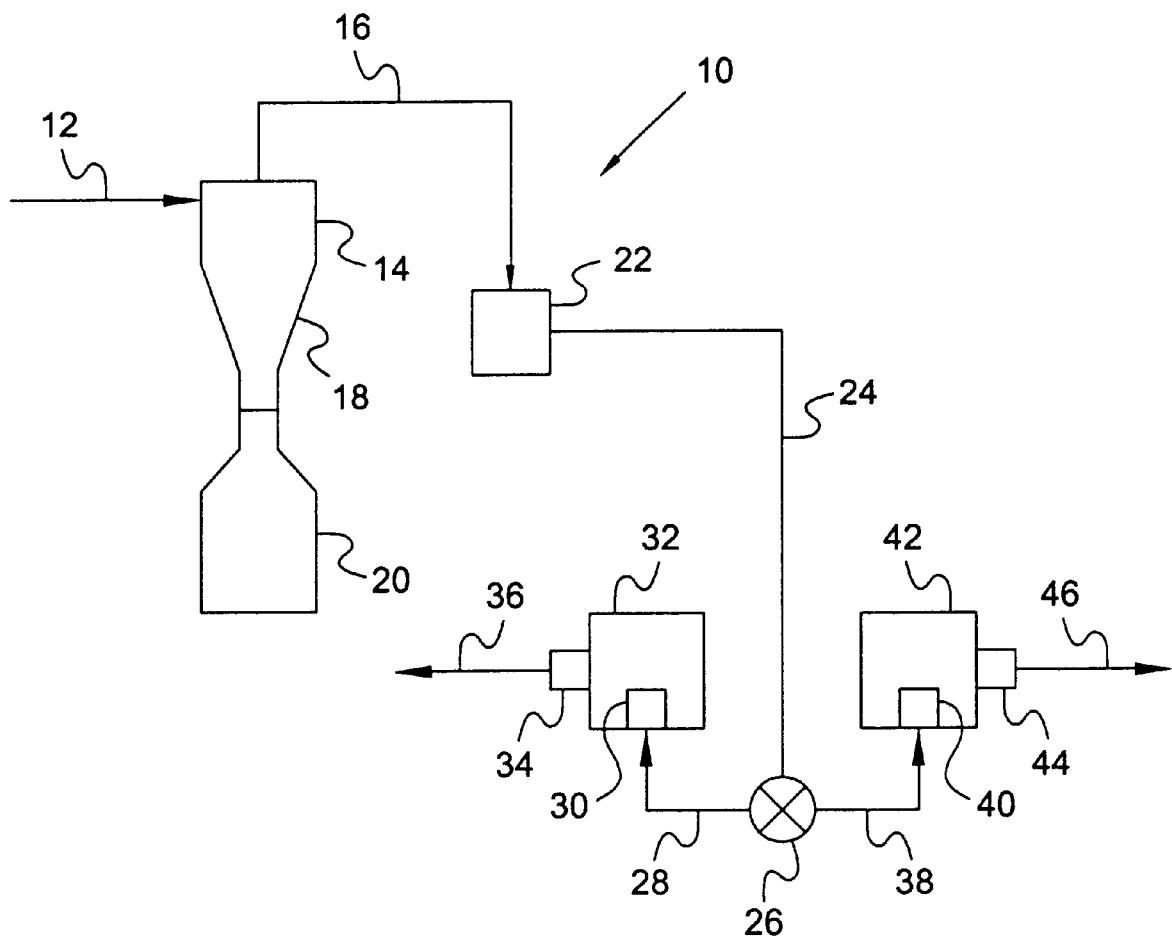
FIG. 1 is a schematic diagram of a particulate solids collection system for a copier/duplicator machine.

In FIG. 1 a typical particulates collection system 10 for a copier/duplicator machine is shown. A gaseous stream containing particulate materials is withdrawn from the copier/duplicator machine via a line 12 and passed to a cyclone separator 14. In cyclone separator 14, particulates are removed as known to those skilled in the art and passed via a particulates outlet 18 to a particulate material collection vessel 20. The gaseous components of the stream in line 12 are recovered via a line 16 and passed to a blower 22 which generates a sufficient vacuum to withdrawn the gaseous stream in line 16 from cyclone separator 14. This vacuum is also sufficient to draw the gaseous stream into line 12 and into cyclone separator 14. The gaseous stream discharged from blower 22 is passed via a line 24 to a proportioning valve 26 where it may be separated in to two streams or alternatively passed to a single further treatment zone. In a preferred embodiment, a portion of the gaseous stream is passed through a line 28 via a blower 30 into a chamber 32. Blower 30 creates a positive pressure in chamber 32 causing the gas to exhaust via a filter 34 into a line 36. The cleaned gas in line 36 may be used in the copier/duplicator machine or otherwise discharged.

A second portion of the stream in line 24 may be passed via a line 38 and a blower 40 into a second chamber 42 from which it is discharged via a filter 44 to a line 46 for discharge to the atmosphere or the like. Two chambers may be used as discussed or the entire gaseous stream may be directed to a single chamber for filtration as desired. Such variations are considered to be well known to those skilled in the art.

A continuing problem has been the determination of when the collection vessel 20 was filled. As indicated previously, the type of solids collected may vary considerably in density, bulk and the like. Vessel 20 is formed with an inlet 48 which is adapted to connect in fluid communication with the discharge from cyclone separator 14 at inlet 48 of vessel 20. Vessel 20 as shown comprises an upper reduced diameter portion 50 with a particulate storage area 52 beneath reduced diameter portion 50.

Figure 2:
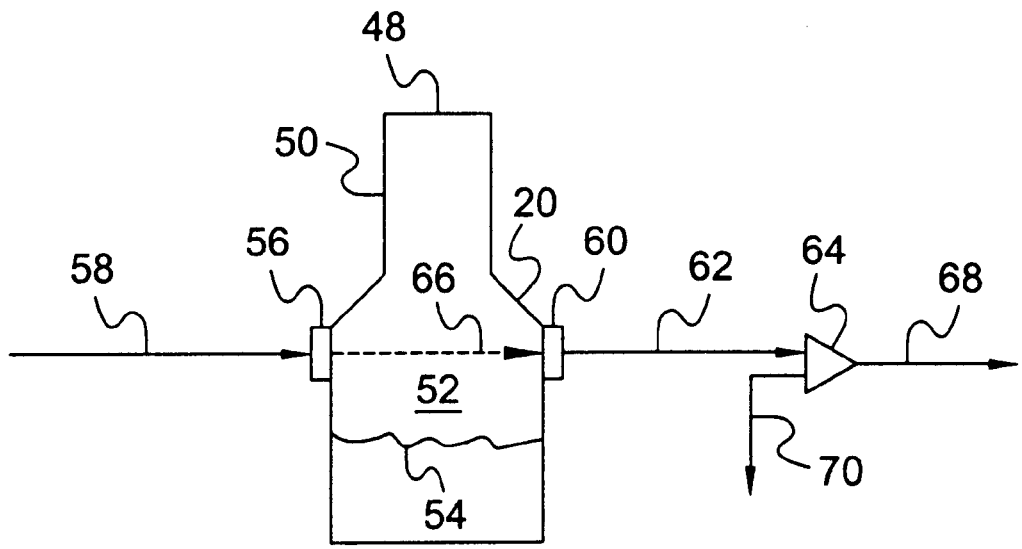
FIG. 2 is a schematic diagram of a particulate material collection vessel according to the present invention.

As shown in FIG. 2, the particulate solids have reached a level 54 in vessel 20. A transmitter transducer 56 is acoustically coupled to vessel 20 with power being supplied to transducer 56 through a line 58. Transducer 56 generates an acoustic wave signal which is a sinusoidal wave in the ultrasonic sound region which is transmitted to a receiver/transducer 60 which is acoustically coupled to the outside of vessel 20. The received signal is transmitted via a line 62 to a comparator 64 where, as known to those skilled in the art, it is processed to produce a signal 68 indicative of a below selected level signal and an above selected signal 70. The selected level in vessel 20, as shown in FIG. 2, is dotted line 66, which corresponds to substantially the center of transducers 56 and 60.

The use of such transducers is considered to be well known to those skilled in the art and such transducers are commonly available commercially. A line of such transducers is marketed by Murata Erie North America, 2200 Lake Park Drive, Smyrna, Ga. 30080. These transducers are available in widely varied frequencies. The ultrasonic range is generally considered to extend from about 10 to about 400 kilohertz. Below about 20 kilohertz, the sounds are audible to the human ear and constitute an undesirable noise pollutant. Frequencies higher than about 200 kilohertz are also less desirable for a variety of reasons. Accordingly, it is preferred that ultrasonic waves between about 20 and about 200 kilohertz be used.

Transducers capable of generating sound waves in this frequency are commonly available as indicated above. Such transducers are typically used by acoustically coupling the transducer to a surface from which a sound wave is to be transmitted or positioning the transducer in an area in which the sound wave is to be received. With metal vessels, braising and the like are effective to acoustically couple the transducers to the vessel. With metal or plastic vessels various adhesives, known to those skilled in the art, are readily available to acoustically couple the transducers to the vessel.

Figure 3:
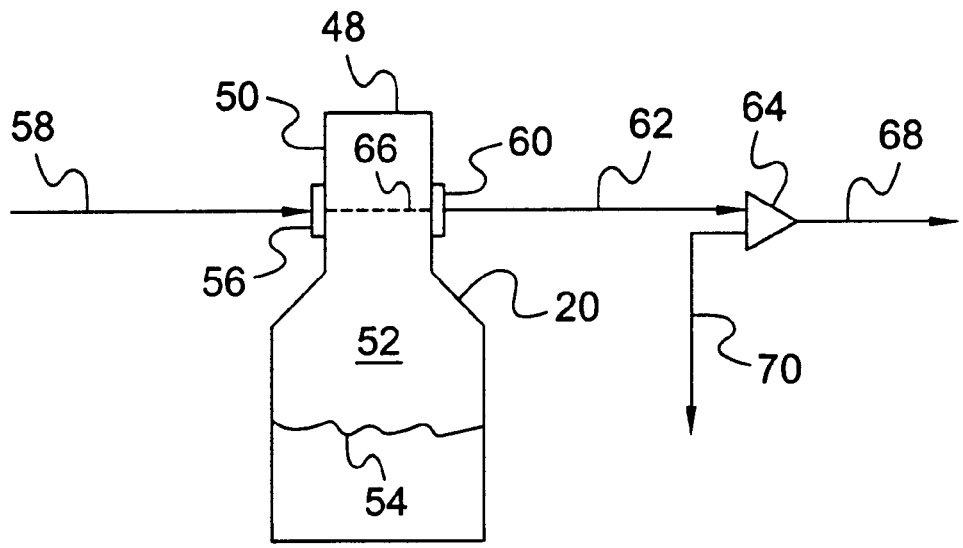
FIG. 3 is a schematic diagram of a further variation of the vessel of the subject invention.

In FIG. 3, the transducers are shown positioned at a much higher selected level in vessel 20. Positioning the transducers at this higher level results in a higher selected level 66 which permits more complete filling of vessel 20 but which provides less time for the operator to note the overfull condition and empty or replace vessel 20.

Figure 4:
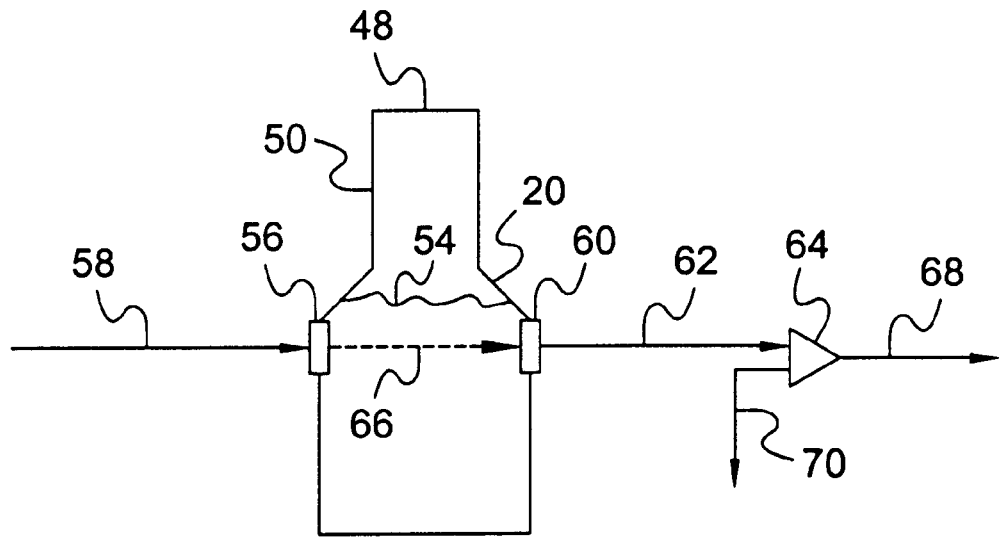
FIG. 4 is a schematic diagram of a further embodiment of the vessel of the present invention.

In FIG. 4, a similar vessel is shown with the transducers being positioned in the walls of vessel 20. Transducers 56 and 60 are readily positioned in the walls of vessel 20 and in this instance no acoustic coupling is necessary since the transmitter 56 and receiver 60 are in direct communication. Please note that in the embodiment shown in FIG. 4, a high solids level is shown which is above selected 66. Vessel 20 is for emptying or replacement.

Figure 5:
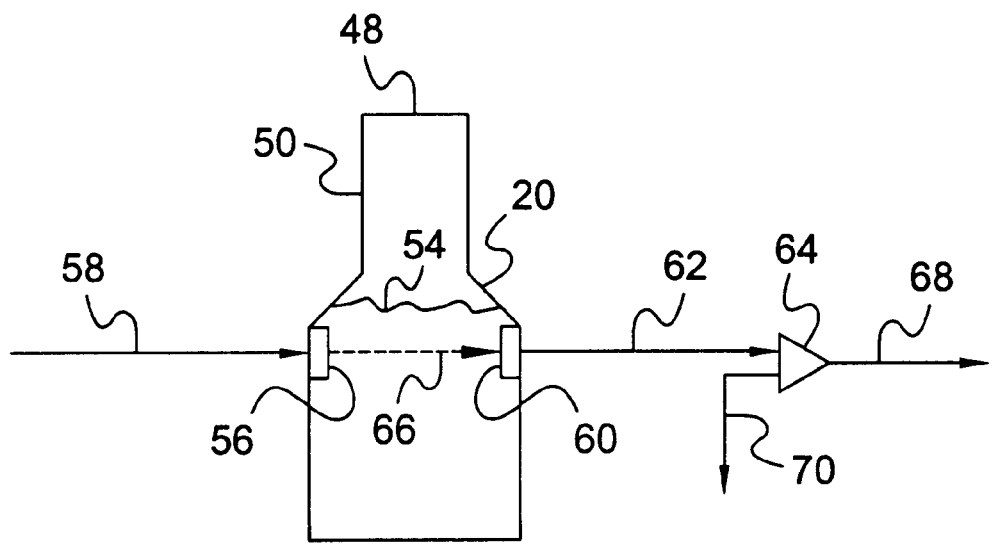
FIG. 5 is a schematic diagram of a further embodiment of the vessel of the present invention; and, FIG. 6 is a schematic diagram of commonly occurring component parts of transducers suitable for use in the present invention.

In FIG. 5, a similar embodiment is shown except that the transducers 56 and 60 are positioned inside vessel 20. In this instance, only the lines providing power and transmitting the received signal need penetrate the sidewalls of vessel 20.

Figure 6:
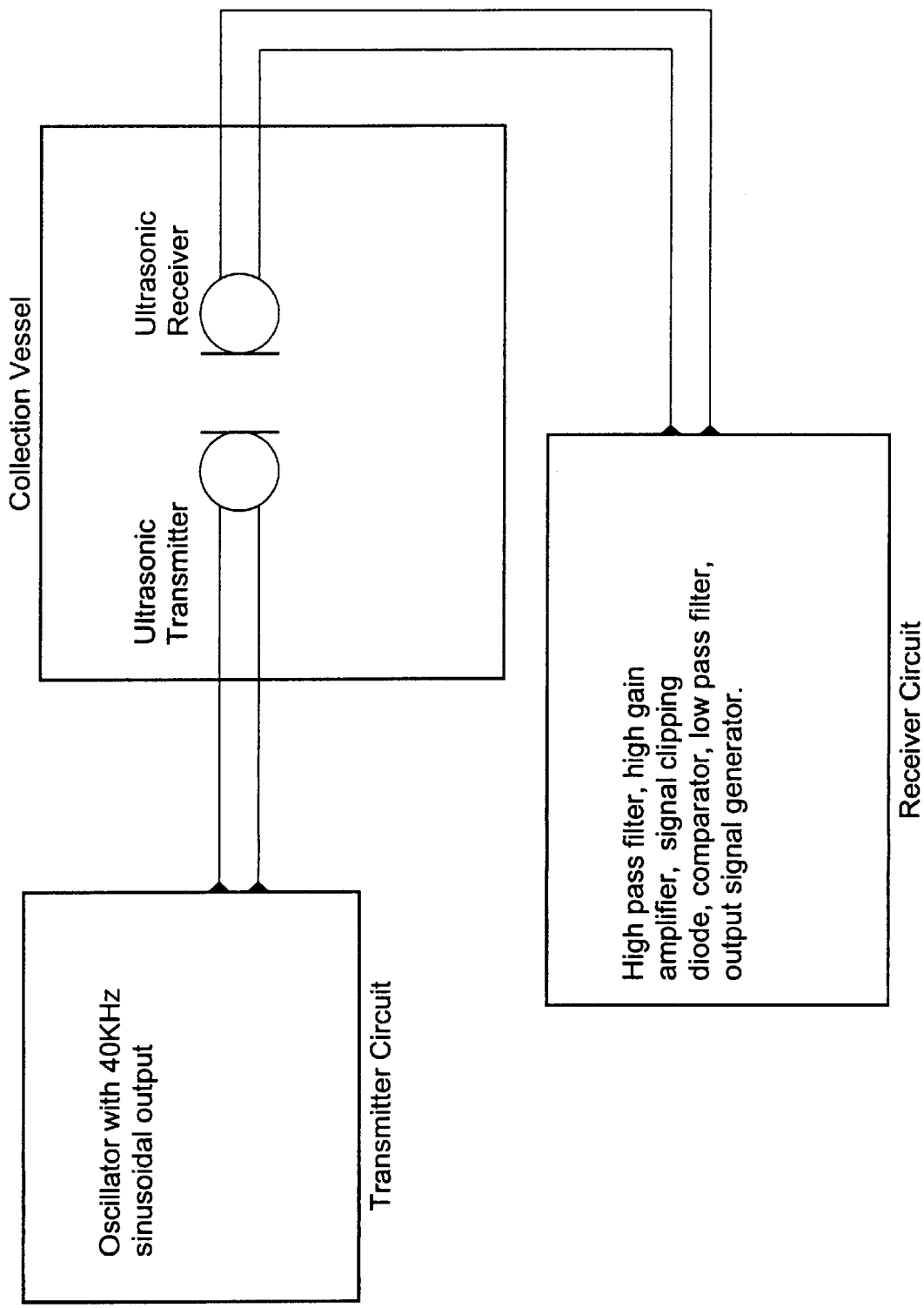

In FIG. 6, a schematic disclosure of components typically used in the transducers and comparators is shown. Typically, the transmitter circuit may comprise an oscillator 100 with a 400-kilohertz sinusoidal output. Any desired frequency sinusoidal output could be selected. The generated signal from the oscillator is transmitted to an ultrasonic transmitter 56, which may be positioned within or in acoustic contact with the outside of the collection vessel with the ultrasonic receiver 60 being positioned within or in acoustical contact with the collection vessel to receive transmissions from the transmitter. The received signals are then passed to a receiver circuit which may comprise a high pass filter, high gain amplifier, signal clipping diode, comparator, a low pass filter and an output signal generator. A wide variety of components may be used to achieve the desired sound wave generation reception and comparison as shown in FIGS. 2, 3, 4, and 5. Such comparisons, as indicated previously are well known to those skilled in the art and transducers and receivers of this type are readily available.

In the practice of the present invention a crystal-based oscillator may be used to generate a controlled and stable signal to operate the transducers within a selected frequency range. A sinusoidal signal is provided.

The first stage of the receiver circuit may be a high pass filter that blocks any direct current components. This precaution is taken because the next step may be a high gain amplifier that produces a bipolar square wave. The negative part of the square wave may then be clipped with a diode with the resulting signal being fed into a comparator. The reference voltage of the comparator 64 is high enough to block the received signal when the transducers have toner or other particulates between them. The comparator feeds into a low pass filter that produces a voltage level when the comparator is passing the received signal. The filter feeds the driver that provides the system's output.

In the practice of the present invention, it has been found that the signal is reduced to an extent sufficient to permit the use of the reference voltage in the comparator to block the flow when the transducers have toner between them while permitting the flow when no particulates are between the transducers, transmitter and receiver. Voltage reductions in the received signal from one-third to one-half have been noted in the evaluation of the present invention.

This is a sufficient difference to permit dependable detection of solids at or above the selected level. This permits the operator to note that the vessel is full and then empty or replace the vessel prior to a spill of particulates into the copier/duplicator machine.

Accordingly, the present invention has provided a reliable and predictably reproducible method for determining the level of particulate solids in a collection vessel so that spills, blowouts and the like in the particulate collection system can be avoided thereby improving the reliability and operability of copier/duplicator machines.

It is noted that the embodiments discussed above are illustrative in nature and that many modifications and variations are possible within the scope of the present invention. Many such modifications and variations may be considered obvious and desirable by those skilled in the art based upon the foregoing description of preferred embodiments.

Having thus described the present invention, we hereby claim:

1. A method for determining a level of particulate contaminate material in a particulate contaminate material collection vessel adapted to collect particulate contaminate material from a cyclone separator in a copier/duplicator machine, the method comprising:
   a) connecting said collection vessel to said cyclone separator;
   b) positioning a transmitter to transmit and ultrasonic wave signal through a particulate storage area in the vessel at a selected level to a receiver;
   c) providing electrical power to the transmitter;
   d) monitoring an ultrasonic wave signal received at the receiver to detect a change in the ultrasonic wave signal indicative of particulate contaminate material at the selected level in the particulate contaminant material storage area; and,
   e) generating a signal indicative of the presence of particulate contaminate material at the selected level in the particulate contaminate material storage area.

2. The method of claim 1 wherein the frequency is from about 20 to about 400 kilohertz.

3. The method of claim 1 wherein the frequency is from about 20 to about 200 kilohertz.

4. The method of claim 1 wherein the transmitter and the receiver are transducers.

5. The method of claim 4 wherein at least one of the transducers is acoustically coupled to the outside of the vessel.

6. The method of claim 4 wherein at least one of the transducers is acoustically coupled in a wall of the vessel.

7. The method of claim 4 wherein at least one of the transducers is positioned inside the vessel.

8. The method of claim 1 wherein the particulate contaminate material comprises paper dust, toner and developer.

9. The method of claim 1 wherein the particulate material comprises developer.

10. A particulate contaminate material collection vessel having a level indicator adapted to collect particulate contaminate material from a cyclone separator in a copier/duplicator machine, the vessel comprising:
   a) a vessel having a particulate contaminate material inlet, the inlet being configured for connection to a cyclone separator particulate contaminate material outlet;
   b) a transmitter transducer acoustically coupled to the vessel or positioned inside the vessel at a selected level and adapted to transmit an acoustic wave signal across at least a portion of a particulate contaminate material storage area inside the vessel;
   c) a receiver acoustically coupled to the vessel or positioned inside the vessel at the selected level and adapted to receive the transmitted acoustic wave signal; and,
   d) a comparator connected to the receiver and adapted to generate a signal responsive to a change in the acoustic wave signal indicative of particulate contaminate material in the particulate contaminate material storage area at the selected level.

* * * * *